United States Patent
Lee et al.

(10) Patent No.: US 12,104,543 B2
(45) Date of Patent: Oct. 1, 2024

(54) HYDROGEN PRESSURE MAINTAINING SYSTEM OF HYDROGEN FUEL ENGINE AND CONTROL METHOD FOR THE SAME

(71) Applicants: Hyundai Motor Company, Seoul (KR); Kia Corporation, Seoul (KR)

(72) Inventors: Seung Woo Lee, Seoul (KR); Kyeonghyeon Lee, Seongnam-Si (KR); Hong Kil Baek, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/210,775

(22) Filed: Jun. 16, 2023

(65) Prior Publication Data

US 2024/0018914 A1 Jan. 18, 2024

(30) Foreign Application Priority Data

Jul. 15, 2022 (KR) .................. 10-2022-0087486

(51) Int. Cl.
*F02D 19/02* (2006.01)
*F02D 41/22* (2006.01)
*F02M 21/02* (2006.01)

(52) U.S. Cl.
CPC ......... *F02D 19/022* (2013.01); *F02D 19/025* (2013.01); *F02D 19/027* (2013.01); *F02D 41/22* (2013.01); *F02M 21/0209* (2013.01); *F02M 21/0221* (2013.01); *F02M 21/0239* (2013.01); *F02M 21/0275* (2013.01); *F02D 2041/228* (2013.01)

(58) Field of Classification Search
CPC .... F02D 19/022; F02D 19/025; F02D 19/027; F02D 41/22; F02D 2041/228; F02D 2200/0602; F02D 41/0027; F02D 19/02; F02M 21/0209; F02M 21/0221; F02M 21/0239; F02M 21/0275; F02M 21/0206; F02M 21/0224; F02M 21/0245; F02M 21/0248; Y02T 10/30; F02B 39/10; F02B 43/10
See application file for complete search history.

(56) References Cited

U.S. PATENT DOCUMENTS

2014/0209179 A1* 7/2014 Maier .................. F02D 41/222
137/12

* cited by examiner

*Primary Examiner* — Jacob M Amick
*Assistant Examiner* — Charles J Brauch
(74) *Attorney, Agent, or Firm* — Banner & Witcoff, Ltd.

(57) ABSTRACT

A hydrogen pressure maintenance system of a hydrogen fuel engine includes a hydrogen tank configured to store hydrogen, an injector configured to inject the hydrogen, a hydrogen internal combustion engine configured to operate using the hydrogen from the injector, a hydrogen pressure controller configured to supply the hydrogen to the injector by controlling a pressure of the hydrogen supplied from the hydrogen tank, a hydrogen pressure intensifier device configured to increase the pressure of the hydrogen and supply the hydrogen to the injector, a hydrogen pressure sensor configured to measure the pressure of the hydrogen and output a signal based on the measured pressure of the hydrogen, a hydrogen bypass valve configured to control the hydrogen to be supplied to the injector through the hydrogen pressure controller or to the injector through the hydrogen pressure intensifier device, and a controller configured to control the hydrogen bypass valve according to the signal from the hydrogen pressure sensor.

15 Claims, 7 Drawing Sheets

HYDROGEN PRESSURE MAINTAINING SYSTEM OF HYDROGEN FUEL ENGINE AND CONTROL METHOD FOR THE SAME

CROSS-REFERENCE TO RELATED APPLICATION

This application claims priority to and the benefit of Korean Patent Application No. 10-2022-0087486 filed in the Korean Intellectual Property Office on Jul. 15, 2022, the entire contents of which are incorporated herein by reference.

BACKGROUND

(a) Field

The present disclosure relates to a hydrogen fuel engine. More particularly, the present disclosure relates to a hydrogen pressure maintenance system of a hydrogen fuel engine and a control method for the same.

(b) Description of the Related Art

In the case of a typical hydrogen internal combustion engine driven vehicle, the hydrogen pressure is lowered by using a hydrogen pressure control valve (e.g., regulator) in a hydrogen tank storing hydrogen fuel at high pressure, and hydrogen fuel at an appropriate pressure is injected into the combustion chamber through an injector.

When the injection pressure of the fuel injected into the combustion chamber increases, the combustion efficiency increases, but if the hydrogen fuel in the hydrogen storage device is less than the injection pressure, it cannot be used, and there is a limit to improving the cruising distance.

For example, suppose that a hydrogen tank with a fully charged pressure of 700 bar contains about 6 kg of hydrogen.

Assuming that the injection pressure of the engine using hydrogen as fuel is 36 bar, when the hydrogen fuel is exhausted, the pressure of the hydrogen tank is 36 bar, which is about 0.3 kg, and when the injection pressure is 36 bar, the fuel efficiency is approximately 50 km/kg, and the range is approximately 285 km.

Assuming that the injection pressure of the engine using hydrogen as fuel is 10 bar, when the hydrogen fuel is exhausted, the pressure of the hydrogen tank is 10 bar, which is about 0.08 kg, and when the injection pressure is 10 bar, the fuel efficiency is about 42 km/kg, and the range is approximately 207 km.

That is, when the injection pressure is increased, the combustion efficiency is increased, but the remaining amount having less than the injection pressure of the hydrogen tank cannot be used, so there is a limit to improving the cruising distance.

For example, if the residual amount can be reduced while maintaining the injection pressure of 36 bar, the cruising distance can be improved. That is, if the residual pressure is assumed to be 1 bar, the cruising distance can be improved by about 5.2% from 285 km to 299.7 km.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a hydrogen pressure maintenance system of a hydrogen fuel engine and a control method for the same that may increase the vehicle's cruising distance by maintaining the pressure of the hydrogen fuel.

According to the present disclosure, a hydrogen pressure maintenance system of a hydrogen fuel engine may include: a hydrogen tank configured to store hydrogen; an injector configured to inject the hydrogen; a hydrogen internal combustion engine configured to operate using the hydrogen from the injector; a hydrogen pressure controller configured to supply the hydrogen to the injector by controlling a pressure of the hydrogen supplied from the hydrogen tank; a hydrogen pressure intensifier device configured to increase the pressure of the hydrogen and supply the hydrogen to the injector; a hydrogen pressure sensor configured to measure the pressure of the hydrogen and output a signal based on the measured pressure of the hydrogen; a hydrogen bypass valve configured to control the hydrogen to be supplied to the injector through the hydrogen pressure controller or to the injector through the hydrogen pressure intensifier device; and a controller configured to control the hydrogen bypass valve according to the signal from the hydrogen pressure sensor.

The controller may be configured to, based on the signal from the hydrogen pressure sensor being less than or equal to a predetermined pressure, control the hydrogen bypass valve to supply the hydrogen to the injector through the hydrogen pressure intensifier device.

The hydrogen pressure intensifier device may include: a pneumatic booster pump configured to boost the pressure of the hydrogen; and a pneumatic provider configured to provide pneumatic pressure to drive the pneumatic booster pump.

The pneumatic provider may include: a supercharger configured to increase an air pressure inflow to the hydrogen internal combustion engine; and a pneumatic control valve configured to supply the pneumatic pressure of the supercharger to the pneumatic booster pump.

The controller may be further configured to control the pneumatic control valve to supply the pneumatic pressure of the supercharger to the pneumatic booster pump based on the signal from the hydrogen pressure sensor being less than or equal to a predetermined pressure.

The supercharger may include an electric supercharger. The controller may be further configured to, based on the signal from the hydrogen pressure sensor being less than or equal to a predetermined pressure, control the electric supercharger and the pneumatic control valve to supply the pneumatic pressure to the pneumatic booster pump.

The pneumatic provider may include an air compressor. The controller may be further configured to, based on the signal from the hydrogen pressure sensor being less than or equal to a predetermined pressure, control the air compressor to supply the pneumatic pressure of the air compressor to the pneumatic booster pump.

The hydrogen pressure intensifier device may include an electric hydrogen booster pump. The controller may be further configured to, based on the signal from the hydrogen pressure sensor being less than or equal to the predetermined pressure, control the electric hydrogen booster pump.

The hydrogen pressure sensor may be configured to measure the pressure of the hydrogen inside at least one of the hydrogen tank, the hydrogen pressure controller, or the injector.

The hydrogen pressure maintenance system may further include: a warning device configured to output a warning signal based on a signal from the controller and based on the signal from the hydrogen pressure sensor being less than or equal to a predetermined pressure.

According to the present disclosure, a method may include: measuring, by a hydrogen pressure sensor, a pressure of hydrogen, wherein the hydrogen is stored in a hydrogen tank and supplied to a hydrogen internal combustion engine via an injector; outputting, by the hydrogen pressure sensor, a signal based on the measured pressure; controlling, by a controller, a hydrogen bypass valve to supply the hydrogen to a hydrogen pressure intensifier device based on the signal from the hydrogen pressure sensor being less than or equal to a predetermined warning pressure; and controlling, by the controller, the hydrogen pressure intensifier device to increase the pressure of the hydrogen and supply the hydrogen from the hydrogen pressure intensifier device to the injector.

The method may further include: controlling, by the controller, a warning device to output a warning signal based on the signal from the hydrogen pressure sensor being less than or equal to the predetermined warning pressure.

According to the present disclosure, a method may include: measuring, by a hydrogen pressure sensor, a pressure of hydrogen, wherein the hydrogen is stored in a hydrogen tank and supplied to a hydrogen internal combustion engine via an injector; outputting, by the hydrogen pressure sensor, a signal based on the measured pressure; controlling, by a controller, a warning device to output a warning signal based on the signal from the hydrogen pressure sensor being less than or equal to a first predetermined warning pressure; controlling, by the controller, a hydrogen bypass valve to supply the hydrogen to a hydrogen pressure intensifier device based on the signal from the hydrogen pressure sensor being less than or equal to a second predetermined warning pressure; and controlling, by the controller, the hydrogen pressure intensifier device to supply the hydrogen to the injector by increasing the pressure of the hydrogen.

The first predetermined warning pressure may be set higher than the second predetermined warning pressure.

According to the hydrogen pressure maintenance system of a hydrogen fuel engine and the control method for the same according to the present disclosure, the cruising distance of a vehicle can be increased by maintaining the pressure of hydrogen fuel used in the engine.

In addition, the effects obtainable or predicted by the embodiments of the present disclosure are to be disclosed directly or implicitly in the detailed description of the present disclosure. That is, various effects predicted according to an embodiment of the present disclosure will be disclosed in the detailed description to be described later.

BRIEF DESCRIPTION OF THE DRAWINGS

Since these drawings are for reference in describing example embodiments of the present disclosure, the technical spirit of the present disclosure should not be construed as being limited to the accompanying drawings.

<Description of symbols>

| | |
|---|---|
| 10: controller | 20: hydrogen pressure sensor |
| 30: hydrogen bypass valve | |
| 40: hydrogen pressure intensifier device | |
| 42: pneumatic booster pump | 50: pneumatic provider |
| 52: supercharger | 54: pneumatic control valve |
| 60: air compressor | |
| 70: electric hydrogen booster pump | |
| 80: hydrogen tank | |
| 90: hydrogen internal combustion engine | |
| 92: injector | 100: hydrogen pressure controller |
| 130: warning device | |

DETAILED DESCRIPTION

The present disclosure will be described more fully hereinafter with reference to the accompanying drawings, in which example embodiments of the disclosure are shown.

As those skilled in the art would realize, the described embodiments may be modified in various different ways, all without departing from the spirit or scope of the present disclosure.

In order to clearly explain the present disclosure, parts irrelevant to the description are omitted, and the same reference numerals are assigned to the same or similar elements throughout the specification.

Since the size and thickness of each component shown in the drawings are arbitrarily indicated for convenience of description, the present disclosure is not necessarily limited to that shown in the drawings, and the thickness is enlarged to clearly express various parts and regions.

In addition, in the following detailed description, the names of the components are divided into first, second, and the like to distinguish them in the same relationship, and the order is not necessarily limited in the following description.

Throughout the specification, when it is said that a certain part includes certain constituent elements, this means that other constituent elements may be further included, rather than excluding other constituent elements, unless specifically stated otherwise.

In addition, terms such as . . . portion, part, means, device, etc. described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

One or more example embodiments of the present disclosure will hereinafter be described in detail with reference to the accompanying drawings.

Figure 1:
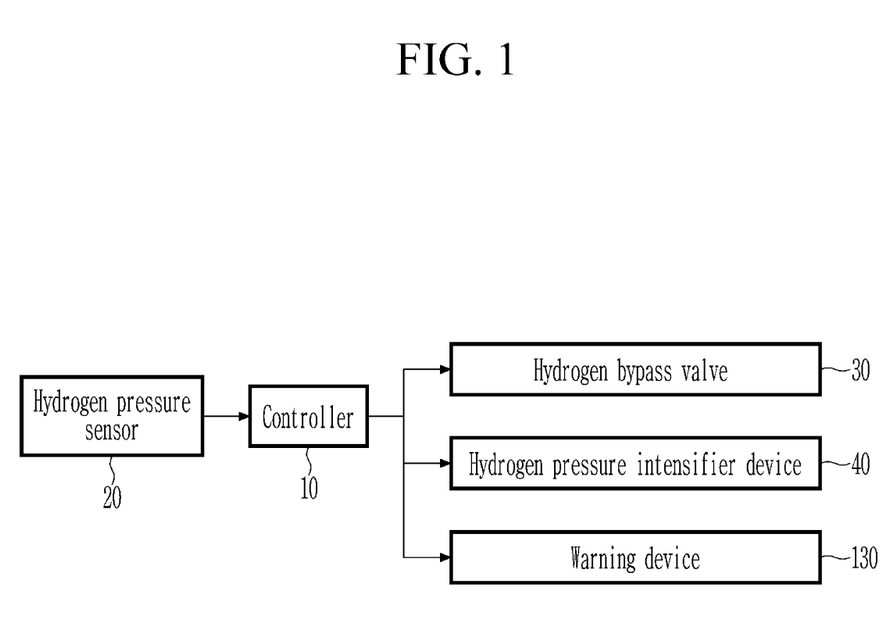
FIG. 1 is a schematic block diagram of a hydrogen pressure maintenance system of a hydrogen fuel engine.

FIG. 1 is a schematic block diagram of a hydrogen pressure maintenance system of a hydrogen fuel engine.

Referring to FIG. 1, the hydrogen pressure maintenance system of a hydrogen fuel engine may include a hydrogen pressure sensor 20 that measures the pressure of hydrogen and outputs the corresponding signal, a hydrogen bypass valve 30 equipped to change a hydrogen supply route described later, a hydrogen pressure intensifier device 40 that selectively increases hydrogen pressure, and a controller 10 that controls the operation of the hydrogen bypass valve 30 and the hydrogen pressure intensifier device 40 according to the output signal of the hydrogen pressure sensor 20.

The controller 10 may be implemented by one or more microprocessors operated by a set program, and the set program may include a series of instructions for performing a method according to one or more embodiments of the present disclosure to be described later.

Figure 2:
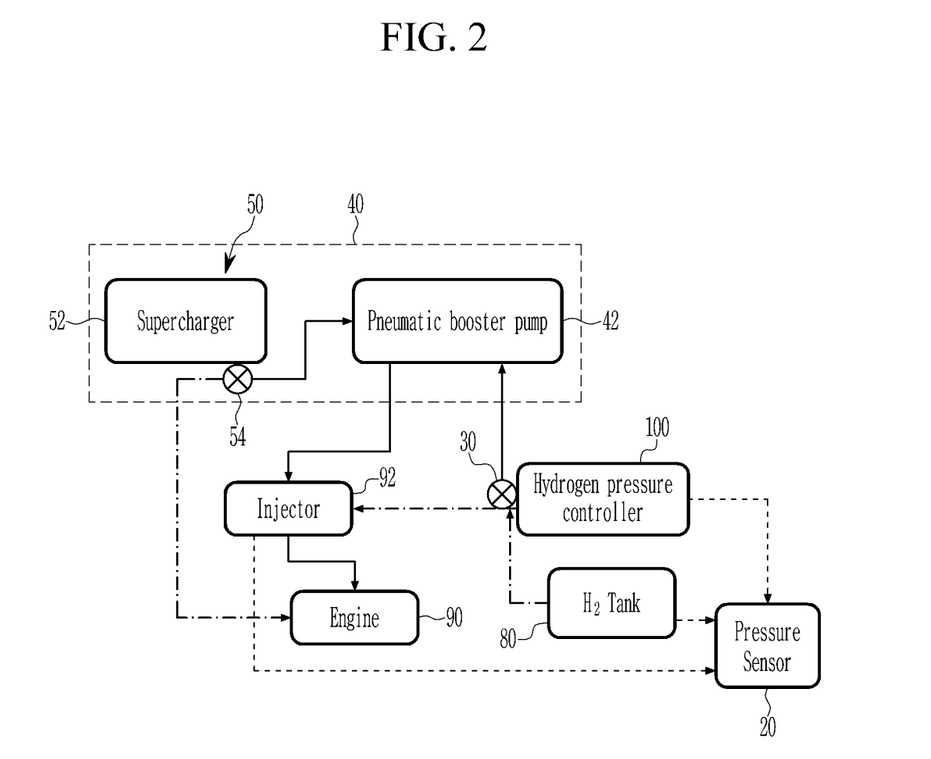
FIG. 2 is a schematic diagram of the hydrogen pressure maintenance system of a hydrogen fuel engine.

FIG. 2 is a schematic diagram of the hydrogen pressure maintenance system of a hydrogen fuel engine.

Referring to FIG. 1 and FIG. 2, the hydrogen pressure maintenance system of a hydrogen fuel engine may include a hydrogen tank 80, an injector 92 that injects hydrogen, a hydrogen internal combustion engine 90 operated using the hydrogen from the injector 92, a hydrogen pressure controller 100 that supplies hydrogen to the injector 92 by controlling the pressure of hydrogen supplied from the hydrogen tank 80, the hydrogen pressure intensifier device 40, which selectively increases the pressure of hydrogen and supplies the hydrogen to the injector 92, the hydrogen pressure sensor 20, the hydrogen bypass valve which selectively controls hydrogen to be supplied to the injector 92 through the hydrogen pressure controller 100 or to the injector 92 through the hydrogen pressure intensifier device 40, and the controller 10 that controls the operation of the hydrogen bypass valve 30 according to the output signal of the hydrogen pressure sensor 10.

For example, if the allowable pressure of the hydrogen tank 80 is 700 bar and hydrogen is charged to 700 bar, about 6 kg of the hydrogen can be stored in the hydrogen tank 80.

That is, it is assumed that the hydrogen tank 80 has a capacity to store about 6 kg of hydrogen when its internal pressure is 700 bar.

Assuming that the injection pressure of the injector 92 is 36 bar, when the hydrogen fuel is exhausted, the pressure of the hydrogen tank is 36 bar, which is about 0.3 kg, and when the injection pressure is 36 bar, the fuel efficiency is approximately 50 km/kg, the range is approximately 285 km.

The hydrogen pressure controller 100 may be a regulator that reduces pressure of the hydrogen delivered from the hydrogen tank 80 to an injection pressure, for example, 36 bar that is injected from the injector 92, and delivers the hydrogen to the injector 92.

Since the configuration of the regulator and its operation are obvious to those skilled in the art, a detailed description thereof will be omitted.

However, if, for example, the remaining amount of the hydrogen tank 80 can be reduced while maintaining the injection pressure of 36 bar, the cruising distance can be improved.

That is, assuming that the pressure of the remaining amount in the hydrogen tank 80 is 1 bar, the cruising distance can be improved by about 5.2% from 285 km to 299.7 km.

In the hydrogen pressure maintenance system of the hydrogen fuel engine, if the output signal of the hydrogen pressure sensor 20 is less than or equal to a predetermined pressure, the controller 10 may control the operation of the hydrogen bypass valve 30 so that hydrogen is supplied to the injector 92 through the hydrogen pressure intensifier device 40.

The hydrogen pressure intensifier device 40 may include a pneumatic booster pump 42 that boosts the hydrogen pressure, and a pneumatic provider that provides pneumatic pressure to drive the pneumatic booster pump 42.

The pneumatic provider 50 may include a supercharger 52 that increases the air pressure inflow to the engine, and a pneumatic control valve 54 that selectively supplies the pneumatic pressure of the supercharger 52 to the pneumatic booster pump 42.

When the output signal of the hydrogen pressure sensor 20 is less than a predetermined pressure, the controller 10 controls the operation of the pneumatic control valve 54 so that the pneumatic pressure of the supercharger 52 is supplied to the pneumatic booster pump 42.

The supercharger 52 may be configured to increase the inflow intake pressure using the exhaust pressure of the engine 90, but the pneumatic booster pump 42 is operated using the pneumatic pressure generated by the supercharger 52 to minimize the increase of additional elements while increasing the hydrogen pressure supplied to the injector 92.

For example, the pneumatic booster pump 42 may be a pneumatically operated linear pump, and the pneumatic booster pump 42 may boost hydrogen delivered from the hydrogen bypass valve 30 and supply it to the injector 92.

The supercharger 52 may include an electric supercharger.

That is, if the output signal of the hydrogen pressure sensor 20 is be less than a predetermined pressure, the controller 10 operates the electric supercharger 52 and controls the operation of the pneumatic control valve 54 so that pneumatic pressure is supplied to the pneumatic booster pump 42.

If the electric supercharger 52 is in operation, the controller 10 may operate the electric supercharger 52 at a higher speed to secure the air pressure supplied to the pneumatic booster pump 42.

In the hydrogen pressure maintenance system of the hydrogen fuel engine, it is possible to drive the pneumatic booster pump 42 by using various types of supercharger 52 to assist the operation of the engine 90. Accordingly, the increase in the number of parts may be minimized, and the cost and weight may be reduced.

Figure 3:
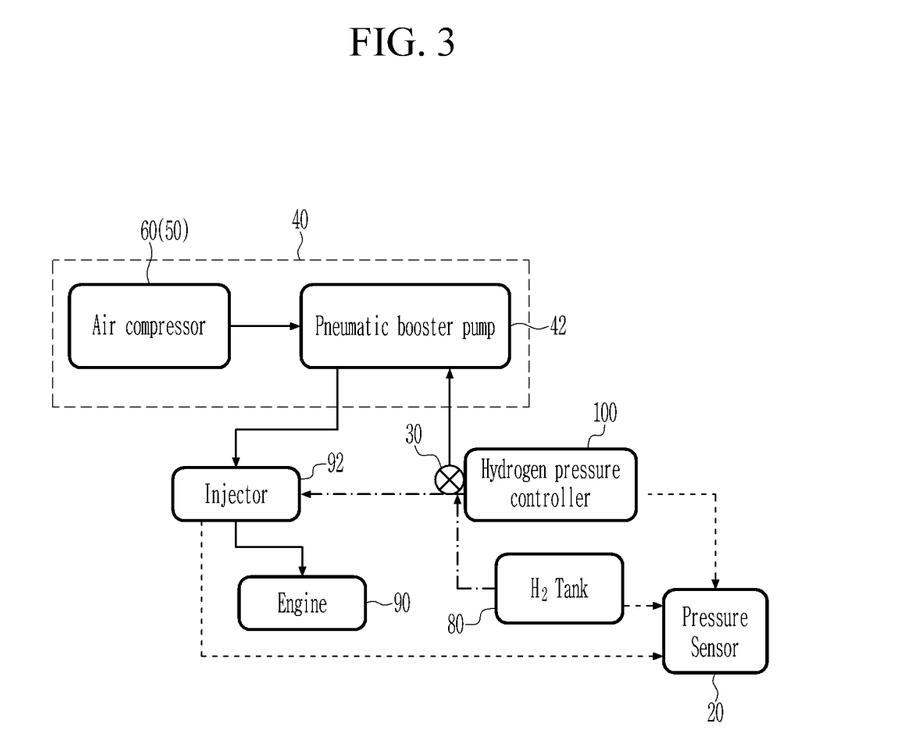
FIG. 3 is a schematic diagram of a hydrogen pressure maintenance system of a hydrogen fuel engine.

FIG. 3 is a schematic diagram of a hydrogen pressure maintenance system of a hydrogen fuel engine.

In describing the hydrogen pressure maintenance system of a hydrogen fuel engine shown in FIG. 3, referring to FIG. 2, if the same/similar reference numbers are used for the same/similar configuration as the hydrogen pressure maintenance system of the hydrogen fuel engine, repeated description will be omitted.

Referring to FIG. 1 and FIG. 3, the pneumatic provider 50 may be an air compressor 60, and if the output signal of the hydrogen pressure sensor 20 is less than the predetermined pressure, the controller 10 operates the air compressor 60 so that the pneumatic pressure of the air compressor 60 is supplied to the pneumatic booster pump 42.

The air compressor 60 may be, for example, an electric air compressor, or a mechanical compressor operated using the power of the engine 90, but is not limited thereto, and various types of compressors may be used.

Since the configuration and operation of the air compressor are obvious to those skilled in the art, a detailed description thereof will be omitted.

Figure 4:
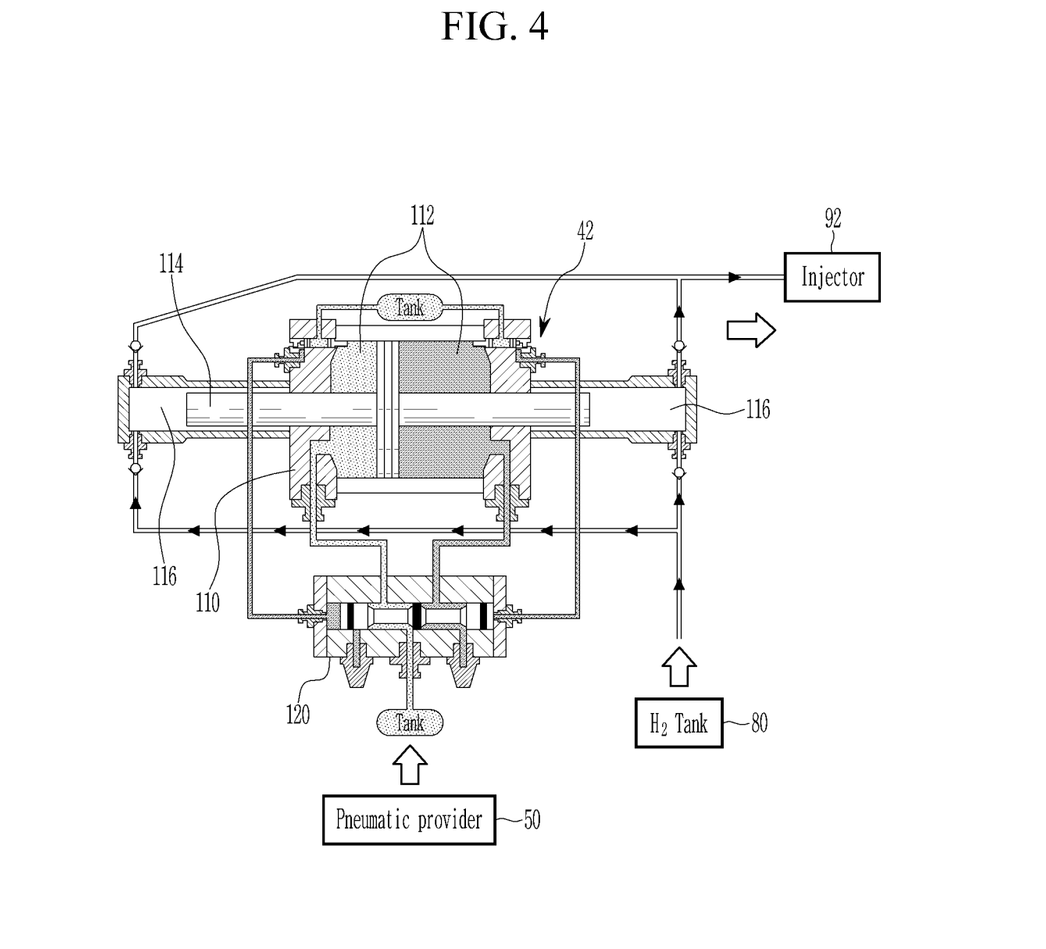
FIG. 4 is a drawing showing a hydrogen pressure intensifier device that may be applied to a hydrogen pressure maintenance system of a hydrogen fuel engine.

FIG. 4 is a drawing showing a hydrogen pressure intensifier device that may be applied to a hydrogen pressure maintenance system of a hydrogen fuel engine.

Hereinafter, referring to FIG. 1 to FIG. 4, a hydrogen pressure intensifier device that may be applied to a hydrogen pressure maintenance system of a hydrogen fuel engine.

The pneumatic booster pump 42 may be, for example, a pneumatically operated linear pump and may include a pump controller 120 and a pump housing 110.

A pump rod 114 is movably mounted in the pump housing 110 to partition the pressure chambers 112.

When pneumatic pressure is supplied from the pneumatic provider 50, for example the supercharger 52 or the air compressor 60, the pneumatic pressure is supplied to one of the pressure chambers 112 by the control of the pump controller 120, which will reciprocate the pump rod 114 to the left and right of the drawing.

Hydrogen supplied from the hydrogen tank 80 is supplied to the boosting chambers 116, and the pressure is increased according to the reciprocal motion of the pump rod 114, so that it can be supplied to the injector 92.

The hydrogen pressure intensifier device that may be applied to the hydrogen pressure maintenance system of the hydrogen fuel engine as shown in FIG. 4 is shown to help understanding, and is not limited to the configuration shown in the drawing, and various types of instruments that can increase the pressure using various types of pneumatic pressure may be applied.

Figure 5:
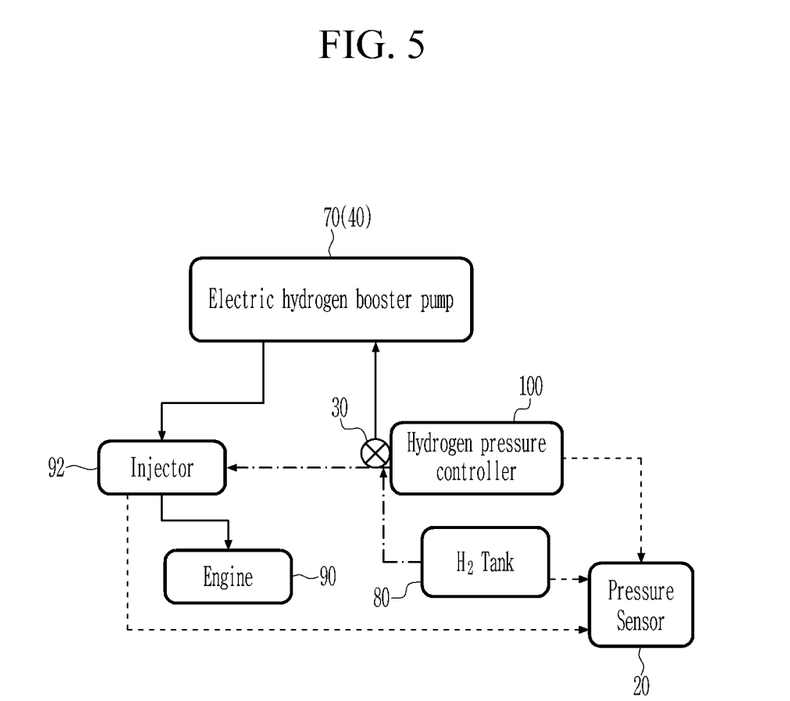
FIG. 5 is a schematic diagram of a hydrogen pressure maintenance system of a hydrogen fuel engine.

FIG. 5 is a schematic diagram of a hydrogen pressure maintenance system of a hydrogen fuel engine.

Referring to FIG. 1 and FIG. 5, the hydrogen pressure intensifier device may be an electric hydrogen booster pump 70, and when the output signal of the hydrogen pressure sensor 20 is less than a predetermined pressure, the controller 10 may operate the electric hydrogen booster pump 70.

That is, the configuration of the pneumatic provider 50 and the pneumatic control valve 54 described above may be omitted, and the hydrogen delivered from the hydrogen bypass valve 30 is boosted by using the electric hydrogen booster pump 70, and then supplied to the injector 92.

This can reduce the entire number of parts.

The electric hydrogen booster pump 70 may be a booster pump that pumps using various driving sources, such as a general rotation motor or a linear motor operated using electricity, and is obvious to those skilled in the art, so a detailed description will be omitted.

In FIG. 2, FIG. 3 and FIG. 5, the hydrogen pressure sensor 20 measures the hydrogen pressure of at least one of the hydrogen pressure inside the hydrogen tank 80, the hydrogen pressure inside the hydrogen pressure controller 100 or the hydrogen pressure inside the injector 92 and outputs the corresponding signal.

That is, the mount position of the hydrogen pressure sensor 20 may be set to various positions that can measure the hydrogen pressure in the injector 92 or the pressure of hydrogen supplied to the injector 92, or measure the supplied hydrogen pressure or stored hydrogen pressure, and the hydrogen pressure sensor 20 may transmit the corresponding signal to the controller 10.

The hydrogen pressure maintenance system of the hydrogen fuel engine may further include a warning device 130 that outputs a warning signal according to the control of the controller 10 when the output signal of the hydrogen pressure sensor 20 is less than or equal to a predetermined pressure.

The warning device 130 may be in various forms, such as a speaker that outputs the corresponding warning signal by voice or a display that warns with visual information, for example, a warning lamp (warning light) that visually expresses the corresponding signal in the cluster.

Figure 6:
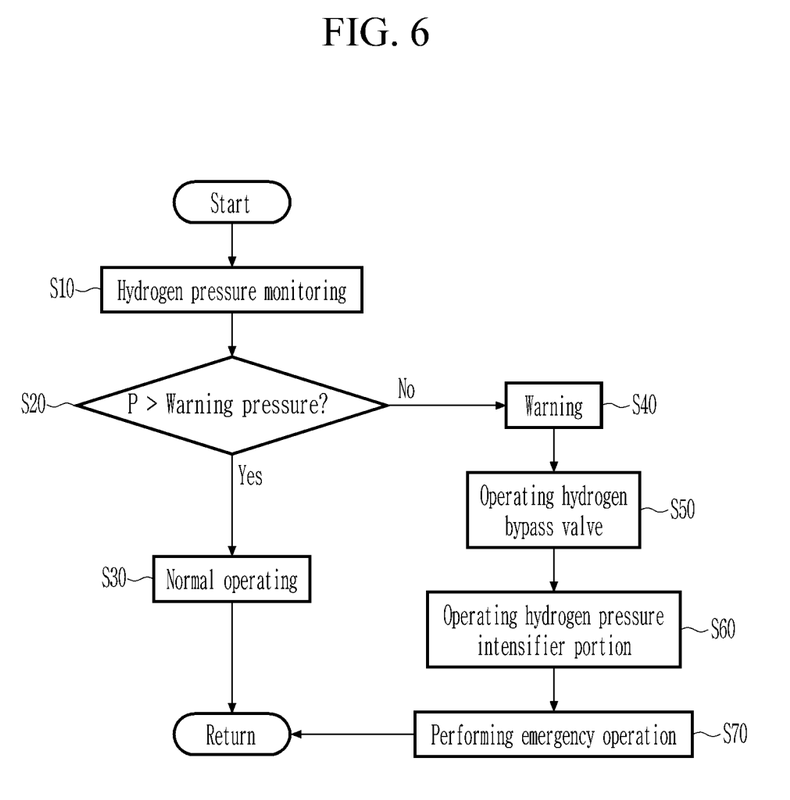
FIG. 6 is a flowchart showing a control method of the hydrogen pressure maintenance system of a hydrogen fuel engine.

FIG. 6 is a flowchart showing a control method of the hydrogen pressure maintenance system of a hydrogen fuel engine.

Hereinafter, referring to FIG. 1 to FIG. 6, a control method of the hydrogen pressure maintenance system of a hydrogen fuel engine will be described.

The control method of the hydrogen pressure maintenance system of the hydrogen fuel engine may be applied to the hydrogen pressure maintenance system of the hydrogen fuel engine as described above.

The control method of the hydrogen pressure maintenance system of the hydrogen fuel engine may include measuring the hydrogen pressure by the hydrogen pressure sensor 20 and outputting a corresponding signal at step S10, comparing, by the controller 10, the output signal of the hydrogen pressure sensor 20 with a predetermined warning pressure at step S20, controlling, by the controller 10, the operation of the hydrogen bypass valve 30 so that hydrogen is supplied to the hydrogen pressure intensifier device 40 when the output signal of the hydrogen pressure sensor 20 is less than the predetermined warning pressure at step S50, controlling, by the controller 10, the operation of the hydrogen pressure intensifier device 40 at step S60, and supplying the hydrogen supplied to the hydrogen pressure intensifier device 40 to the injector 92 by increasing the pressure at step S70.

When the output signal of the hydrogen pressure sensor 20 exceeds the predetermined warning pressure, for example, 36 bar, the hydrogen pressure maintenance system of a hydrogen fuel engine is operated normally by the operation of the controller 10 at step S30.

That is, the hydrogen in the hydrogen tank 80 is supplied to the engine through the injector 92 after the pressure is adjusted by the hydrogen pressure controller 100.

When the output signal of the hydrogen pressure sensor 20 is less than the predetermined warning pressure, for example, 36 bar, the controller 10 controls to operate the hydrogen bypass valve 30 at step S50 and to drive the hydrogen pressure intensifier device 40 at step S60 and to perform emergency operation at step S70.

That is, the hydrogen in the hydrogen tank 80 is supplied to the hydrogen pressure intensifier device 40 by the operation of the hydrogen bypass valve 30, and the injector 92 is operated while the hydrogen pressure is increased by the operation of the hydrogen pressure intensifier device 40, and the hydrogen is supplied to the engine 90.

As described above, the hydrogen pressure maintenance system of the hydrogen fuel engine may further include the warning device 130 that outputs a warning signal. The control method of the hydrogen pressure maintenance system of the hydrogen fuel engine may further include controlling, by the controller 10, the warning device 130 to output a warning signal at step S40 when the output signal of the hydrogen pressure sensor 20 is less than the predetermined warning pressure.

Figure 7:
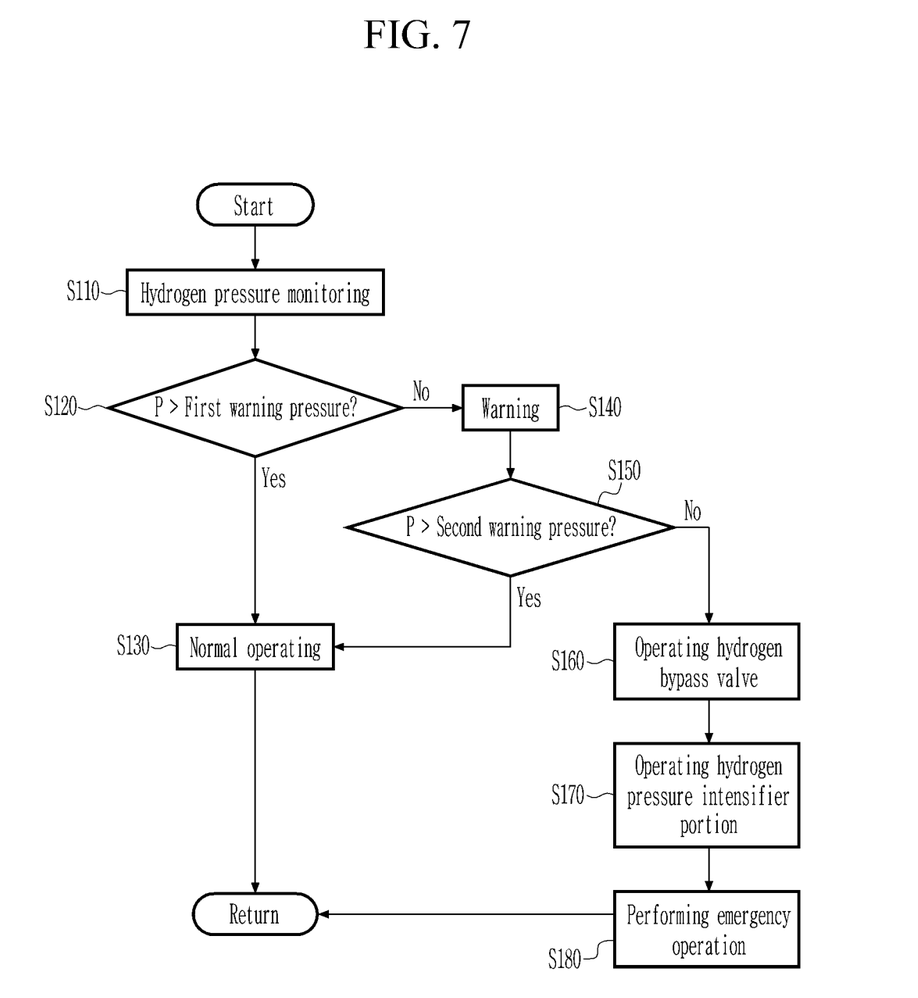
FIG. 7 is a flowchart showing another control method of the hydrogen pressure maintenance system of the hydrogen fuel engine.

FIG. 7 is a flowchart showing another control method of the hydrogen pressure maintenance system of the hydrogen fuel engine.

Hereinafter, referring to FIG. 1 to FIG. 5 and FIG. 7, a control method of the hydrogen pressure maintenance system of a hydrogen fuel engine will be described.

The repeated description of the control method and the same configuration of the hydrogen pressure maintenance system of the hydrogen fuel engine as described with reference to FIG. 6 above will be omitted.

The control method of the hydrogen pressure maintenance system of the hydrogen fuel engine may be applied to the hydrogen pressure maintenance system of the hydrogen fuel engine as described above.

The control method of the hydrogen pressure maintenance system of the hydrogen fuel engine as shown in FIG. 7 is different from the control method of the hydrogen pressure maintenance system of the hydrogen fuel engine as shown in FIG. 6 by setting at least two warning pressures.

The control method of the hydrogen pressure maintenance system of the hydrogen fuel engine may include measuring, by the hydrogen pressure sensor 20, the hydrogen pressure and outputting the corresponding signal at step S110, comparing, by the controller 10, an output signal of the hydrogen pressure sensor 20 with a predetermined first warning pressure at step S120, controlling, by the controller 10, the warning device 130 to output a warning signal at step S140 when the output signal of the hydrogen pressure sensor 20 is less than the predetermined first warning pressure, comparing, by the controller 10, an output signal of the hydrogen pressure sensor 20 with a predetermined second warning pressure at step S150, controlling, by the controller 10, the operation of the hydrogen bypass valve 30 so that hydrogen is supplied to the hydrogen pressure intensifier device 40 when the output signal of the hydrogen pressure sensor 20 is less than the predetermined second warning pressure at step S160, controlling, by the controller 10, the operation of the hydrogen pressure intensifier device 40 at step S170, and supplying the hydrogen supplied to the hydrogen pressure intensifier device 40 to the injector 92 by increasing the pressure at step S180.

The first warning pressure may be set higher than the second warning pressure.

If the output signal of the hydrogen pressure sensor 20 exceeds the first warning pressure, for example 40 bar, by the operation of the controller 10, the hydrogen pressure maintenance system of a hydrogen fuel engine performs normal operation at step S130.

That is, hydrogen in the hydrogen tank 80 is supplied to the engine 90 through the injector 92 after the pressure is adjusted in the hydrogen pressure controller 100.

When the output signal of the hydrogen pressure sensor 20 exceeds the second warning pressure, for example 36 bar, in the state in which the controller operates the warning unit 130 at step S140, the hydrogen pressure maintenance system of the hydrogen fuel engine is operated normally by the operation of the controller 10 at step S130.

That is, when the output signal of the hydrogen pressure sensor 20 is between the first warning pressure and the second warning pressure, the hydrogen pressure maintenance system of the hydrogen fuel engine operates normally S130 and warns the driver through a notice of insufficient fuel.

When the output signal of the hydrogen pressure sensor 20 is less than the second warning pressure, for example 36 bar, the controller 10 operates the hydrogen bypass valve 30 at step S160 and drives the hydrogen pressure intensifier device 40 at step S170 and emergency operation is performed at step S180.

That is, the hydrogen in the hydrogen tank 80 is supplied to the hydrogen pressure intensifier device 40 by the operation of the hydrogen bypass valve 30. And after the hydrogen pressure is increased by the operation of the hydrogen pressure intensifier device 40, the hydrogen is supplied to the engine 90 through the injector 92.

As described above, according to the hydrogen pressure maintenance system of a hydrogen fuel engine and control method for the same, it is possible to increase the cruising distance of the vehicle by maintaining the pressure of the hydrogen fuel used in the engine.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A hydrogen pressure maintenance system of a hydrogen fuel engine, the hydrogen pressure maintenance system comprising:
    a hydrogen tank configured to store hydrogen;
    an injector configured to inject the hydrogen;
    a hydrogen internal combustion engine configured to operate using the hydrogen from the injector;
    a hydrogen pressure controller configured to supply the hydrogen to the injector by controlling a pressure of the hydrogen supplied from the hydrogen tank;
    a hydrogen pressure intensifier device configured to increase the pressure of the hydrogen and supply the hydrogen to the injector;
    a hydrogen pressure sensor configured to measure the pressure of the hydrogen and output a signal based on the measured pressure of the hydrogen;
    a hydrogen bypass valve configured to control the hydrogen to be supplied to the injector through the hydrogen pressure controller or to the injector through the hydrogen pressure intensifier device; and
    a controller configured to control the hydrogen bypass valve according to the signal from the hydrogen pressure sensor.

2. The hydrogen pressure maintenance system of claim 1, wherein the controller is configured to, based on the signal from the hydrogen pressure sensor being less than or equal to a predetermined pressure, control the hydrogen bypass valve to supply the hydrogen to the injector through the hydrogen pressure intensifier device.

3. The hydrogen pressure maintenance system of claim 1, wherein the hydrogen pressure intensifier device comprises:
    a pneumatic booster pump configured to boost the pressure of the hydrogen; and
    a pneumatic provider configured to provide pneumatic pressure to drive the pneumatic booster pump.

4. The hydrogen pressure maintenance system of claim 3, wherein the pneumatic provider comprises:
    a supercharger configured to increase an air pressure inflow to the hydrogen internal combustion engine; and
    a pneumatic control valve configured to supply the pneumatic pressure of the supercharger to the pneumatic booster pump.

5. The hydrogen pressure maintenance system of claim 4, wherein the controller is further configured to control the pneumatic control valve to supply the pneumatic pressure of the supercharger to the pneumatic booster pump based on the signal from the hydrogen pressure sensor being less than or equal to a predetermined pressure.

6. The hydrogen pressure maintenance system of claim 4, wherein the supercharger comprises an electric supercharger.

7. The hydrogen pressure maintenance system of claim 6, wherein the controller is further configured to, based on the signal from the hydrogen pressure sensor being less than or equal to a predetermined pressure, control the electric supercharger and the pneumatic control valve to supply the pneumatic pressure to the pneumatic booster pump.

8. The hydrogen pressure maintenance system of claim 3, wherein the pneumatic provider comprises an air compressor, and
wherein the controller is further configured to, based on the signal from the hydrogen pressure sensor being less than or equal to a predetermined pressure, control the air compressor to supply the pneumatic pressure of the air compressor to the pneumatic booster pump.

9. The hydrogen pressure maintenance system of claim 2, wherein the hydrogen pressure intensifier device comprises an electric hydrogen booster pump, and
wherein the controller is further configured to, based on the signal from the hydrogen pressure sensor being less than or equal to the predetermined pressure, control the electric hydrogen booster pump.

10. The hydrogen pressure maintenance system of claim 1, wherein the hydrogen pressure sensor is configured to measure the pressure of the hydrogen inside at least one of the hydrogen tank, the hydrogen pressure controller, or the injector.

11. The hydrogen pressure maintenance system of claim 1, further comprising:
a warning device configured to output a warning signal based on a signal from the controller and based on the signal from the hydrogen pressure sensor being less than or equal to a predetermined pressure.

12. A method comprising:
measuring, by a hydrogen pressure sensor, a pressure of hydrogen, wherein the hydrogen is stored in a hydrogen tank and supplied to a hydrogen internal combustion engine via an injector;
outputting, by the hydrogen pressure sensor, a signal based on the measured pressure;
controlling, by a controller, a hydrogen bypass valve to supply the hydrogen to a hydrogen pressure intensifier device based on the signal from the hydrogen pressure sensor being less than or equal to a predetermined warning pressure; and
controlling, by the controller, the hydrogen pressure intensifier device to increase the pressure of the hydrogen and supply the hydrogen from the hydrogen pressure intensifier device to the injector.

13. The method of claim 12, further comprising:
controlling, by the controller, a warning device to output a warning signal based on the signal from the hydrogen pressure sensor being less than or equal to the predetermined warning pressure.

14. A method comprising:
measuring, by a hydrogen pressure sensor, a pressure of hydrogen, wherein the hydrogen is stored in a hydrogen tank and supplied to a hydrogen internal combustion engine via an injector;
outputting, by the hydrogen pressure sensor, a signal based on the measured pressure;
controlling, by a controller, a warning device to output a warning signal based on the signal from the hydrogen pressure sensor being less than or equal to a first predetermined warning pressure;
controlling, by the controller, a hydrogen bypass valve to supply the hydrogen to a hydrogen pressure intensifier device based on the signal from the hydrogen pressure sensor being less than or equal to a second predetermined warning pressure; and
controlling, by the controller, the hydrogen pressure intensifier device to supply the hydrogen to the injector by increasing the pressure of the hydrogen.

15. The method of claim 14, wherein
the first predetermined warning pressure is set higher than the second predetermined warning pressure.

* * * * *